April 14, 1931.  W. E. HUMPHREY  1,801,085
MACHINERY FOR MAKING HOLLOW RUBBER BALLS
Filed May 16, 1930  4 Sheets-Sheet 1
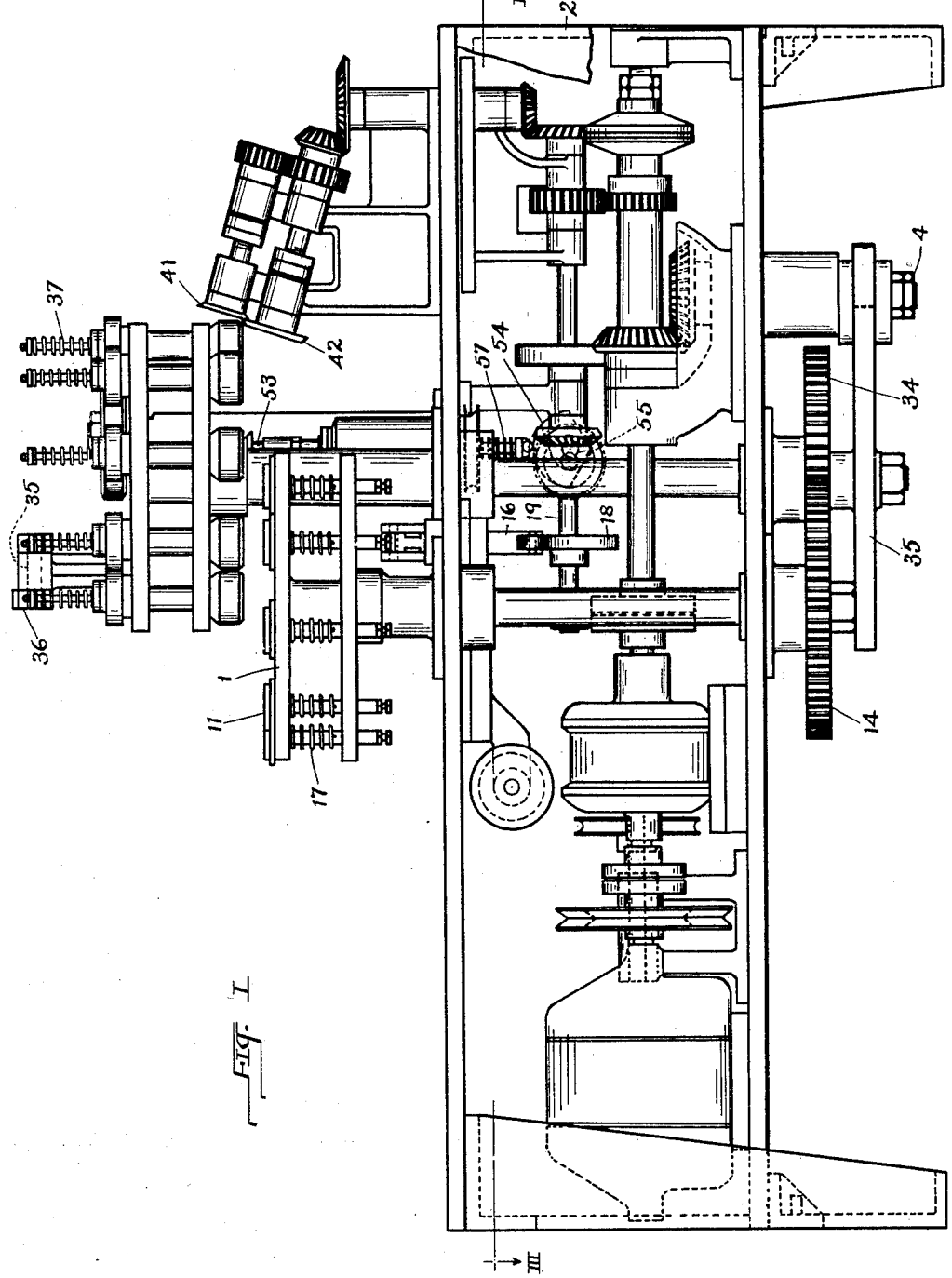
INVENTOR
Walter E. Humphrey
by Christy, Christy and Wharton
his attorneys

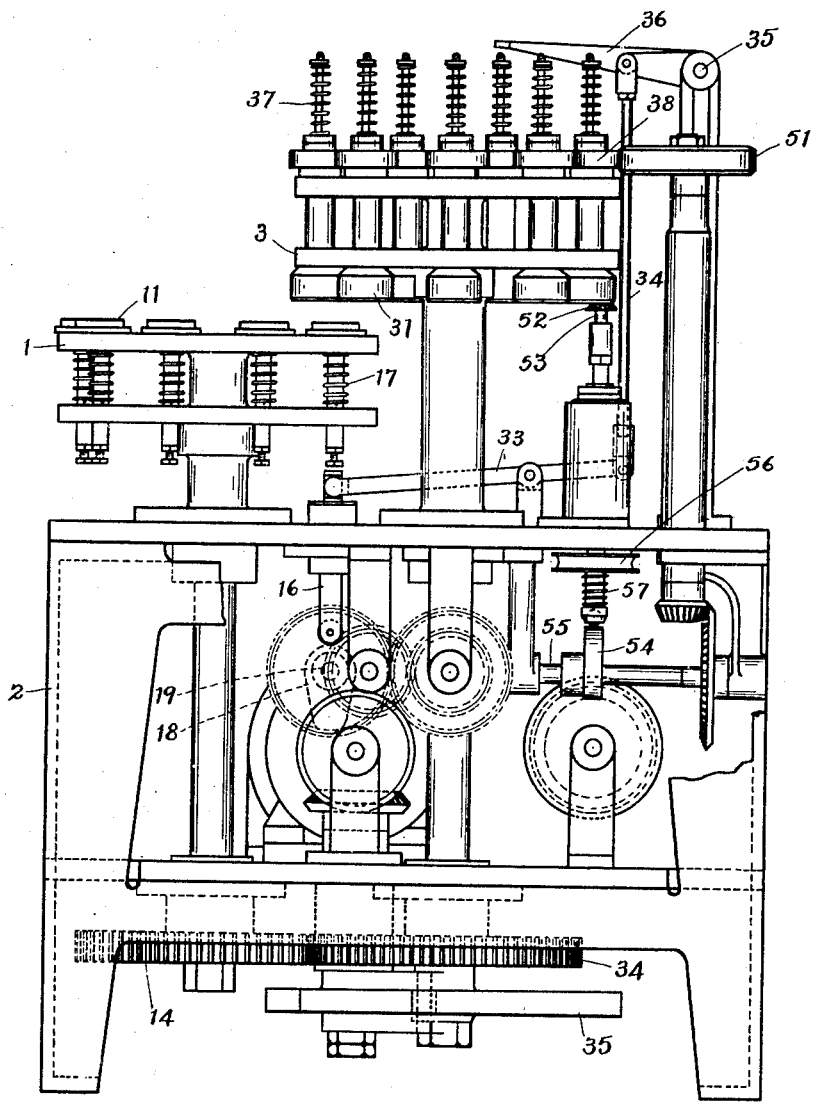
Fig. II

April 14, 1931. W. E. HUMPHREY 1,801,085
MACHINERY FOR MAKING HOLLOW RUBBER BALLS
Filed May 16, 1930 4 Sheets-Sheet 3
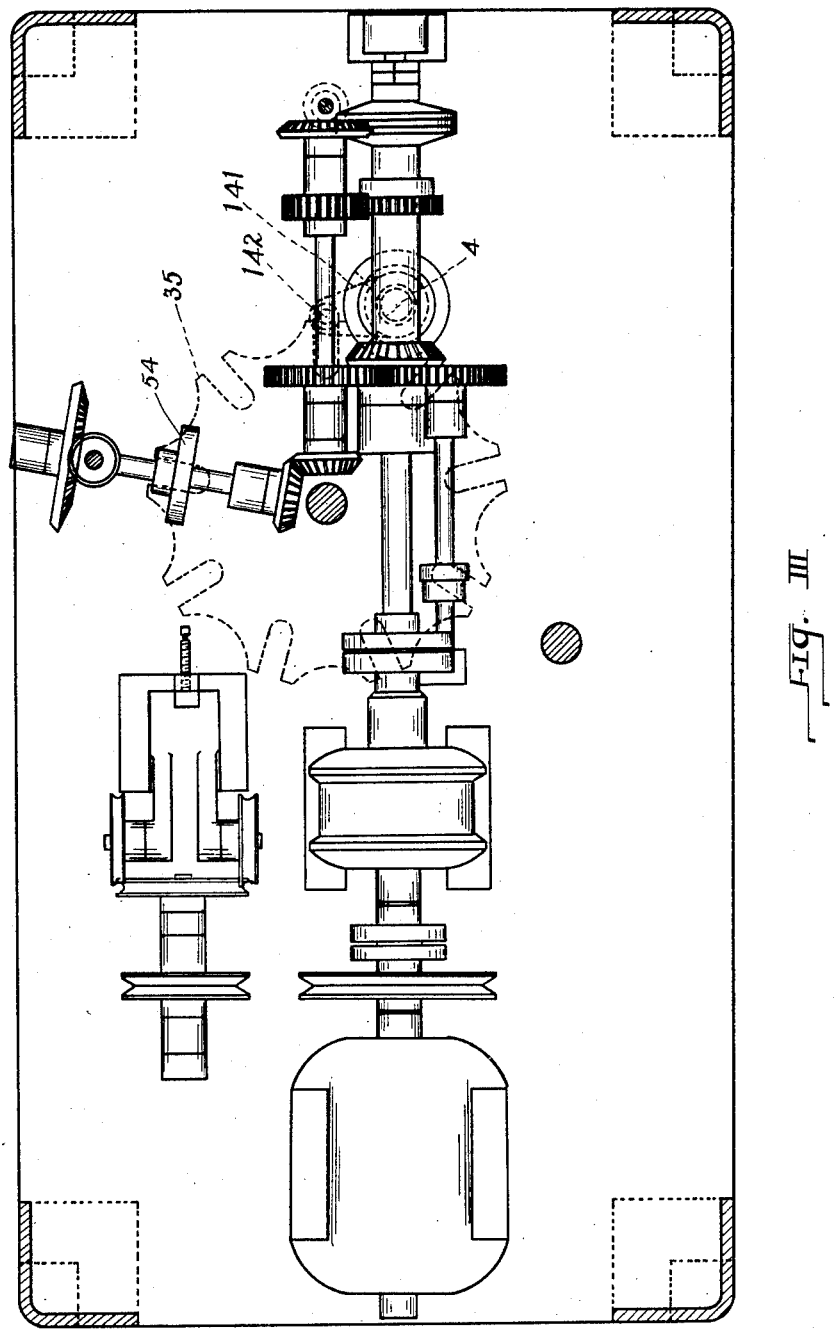
Fig. III
INVENTOR
Walter E. Humphrey
by Christy Christy and Wharton
his attorneys April 14, 1931. W. E. HUMPHREY 1,801,085
MACHINERY FOR MAKING HOLLOW RUBBER BALLS
Filed May 16, 1930 4 Sheets-Sheet 4
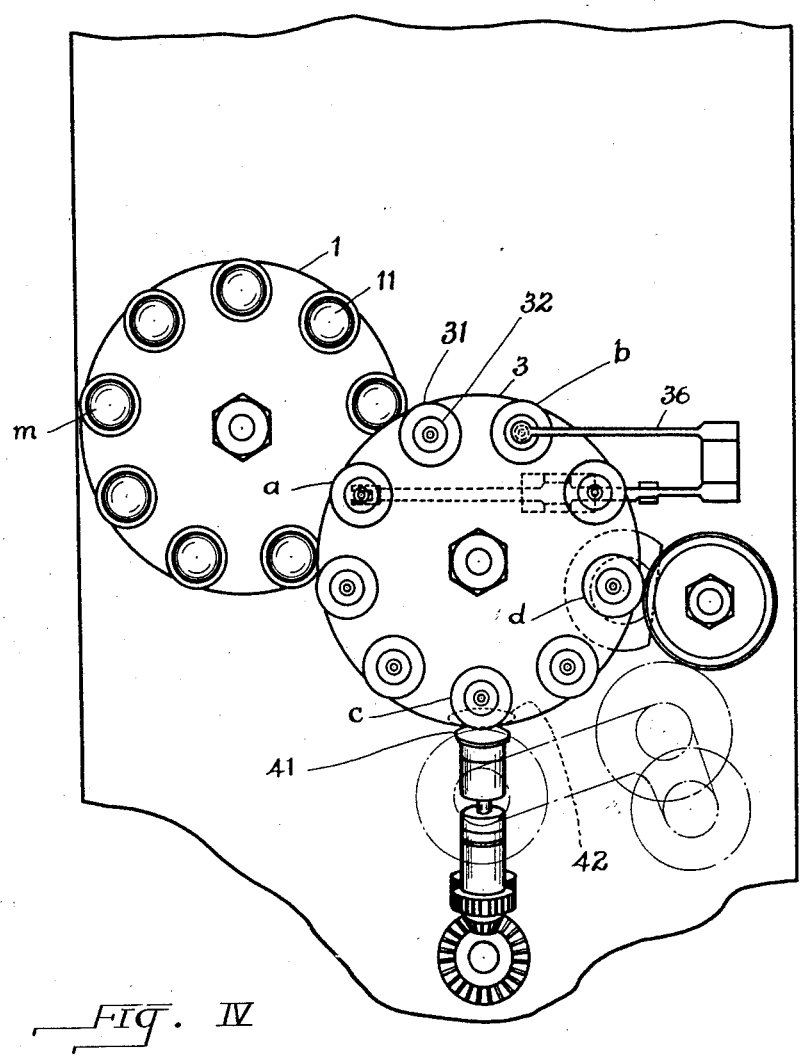
FIG. IV
INVENTOR
Walter E. Humphrey
by Christy Christy and Wharton
his attorneys Patented Apr. 14, 1931

1,801,085

UNITED STATES PATENT OFFICE

WALTER E. HUMPHREY, OF JEANNETTE, PENNSYLVANIA, ASSIGNOR TO PENNSYLVANIA RUBBER COMPANY, OF JEANNETTE, PENNSYLVANIA, A CORPORATION OF PENNSYLVANIA

MACHINERY FOR MAKING HOLLOW RUBBER BALLS

Application filed May 16, 1930. Serial No. 452,889.

My invention relates to improvements in machinery for making hollow rubber balls, and finds practical application in machinery for making tennis balls. The machine of my invention is a machine of simple structure, easily maintained in condition, easily operated, and it affords accuracy and uniformity in its effect upon the articles dealt with, and that is a matter of no little importance in the production of an article so minutely standardized as a tennis ball. Furthermore, the output is rapid, as the conditions of the industry require.

A machine built in embodiment of my invention is illustrated in the accompanying drawings. Fig. I is a view of the machine in side elevation; Fig. II, a view in end elevation. From Fig. II certain parts have, for simplicity of showing, been omitted. Fig. III is a view in horizontal section, on the plane indicated at III—III, Fig. I, and showing in plan the driving parts of the machine. Fig. IV is a fragmentary view of the machine in plan from above.

In the production of tennis balls and other hollow rubber balls, hemispherical shells of raw rubber are pressed in molds, and, while still in the molds, are partially cured. Each ball is formed of two complementary shells having oppositely beveled edges, and the ball is completed by uniting the two shells, beveled edge to beveled edge, and by completing vulcanization of the so built up blank.

In the molding of the hemispherical shells, good practice requires that a small excess of raw rubber be placed in the mold, and in consequence, in the pressing operation a flash or fin is extruded between the edges of the meeting mold parts. This fin is developed along the outer edge of the hemispherical shell. In preparation for further manufacturing steps, the fin must be removed. The beveled edges of the shells are formed in the molds, but the faces of the bevels, which are to meet and to be cemented to or otherwise united with complementary faces, require further preparation, by buffing, before the cement is applied. The machine of my invention trims away the fins and buffs the bevel-faces of the hemispherical shells, as they come from the molds in which they have been shaped and partially vulcanized. That is to say, the machine is a machine for preparing molded ball parts for union into completed balls.

It will be understood that, throughout this specification, I use the term rubber with the meaning it has in common parlance. It is rubber, properly so called, but modified by mixture with it of other materials, designed to give to the finished article the physical properties which suit it precisely to its intended use.

A movable and, advantageously, rotary carrier 1 is mounted in a suitable frame 2. This carrier is conveniently circular in plan and is equipped peripherally with a plurality of seats 11, upon which an attendant may place, concavity downward, one by one, the hemispherical shells as they come from the molds. The drawings shows nine such seats. The particular number is not material. The seats 11 are, in fact, the upper ends of plungers which protrude through openings formed in carrier 1; the plungers form with the carrier a single rotatable unit, but they are vertically reciprocable, relatively to the carrier, to achieve the ends in view.

A second movable and, advantageously, rotary carrier 3 is mounted in the frame 2. It is arranged in a higher plane, but in a plane parallel to that of carrier 1, and it overhangs carrier 1. Conveniently, the carrier 3 also is circular and of equal size with carrier 1; and it too is provided peripherally with a plurality of seats 31, conveniently equal in number to those of carrier 1. The overlap is sufficient and the proportions are such that the seats 11, with which carrier 1 is equipped, and the seats 31, with which carrier 3 is equipped, may come to alignment. The seats 11 upon carrier 1 are adapted to receive the hemispherical blanks, concavity downward, engaging their inner surfaces; the seats 31 are adapted to receive the blanks in the same disposition relatively to the vertical, but to engage them upon their outer surfaces. The seats 31 are of annular shape with concavity shaped to the zone of a sphere, and they are idly rotatable in carrier 3. Cooperating with each seat 31 is a stripper device including a plunger 32 which, rotating as a unit with carrier 3, reciprocates intermittently relatively to the seat 31, in order to effect at proper time the discharge of a seated article.

The two carriers 1 and 3 are caused to rotate oppositely and in unison, with pauses in the continuity of rotation; and the organization is such that, as two seats 11 and 31 come to vertical alignment, rotation shall be arrested for a predetermined interval. During the interval of such arrest a hemispherical shell of rubber, about to be operated upon, may be transferred from its seat in carrier 1 to the aligned seat in carrier 3; while, at the same time, from another seat in carrier 3 another hemispherical shell, having been operated upon, is discharged. Opposite rotation of the two carriers in synchronism is effected by equipping the shafts of the carriers with interengaging gear wheels, 14 and 34, of equal size; and the desired intermittence of rotation is effected by the provision of a constantly rotating shaft 4, equipped with a crank 141 and a crank-pin 142, which crank-pin engages intermittently, as shaft 4 rotates, a star gear-wheel or Geneva cam 35, with which the shaft of one of the two carriers is equipped.

A plunger 16 is mounted for vertical reciprocation in the frame 2 and is so situated that, when the rotating carriers come to rest, it is beneath and is vertically aligned with the aligned seats 11 and 31. I have said that the seats 11 are, in fact, the upper ends of vertically reciprocable plungers. These plungers 11 come to rest in alignment with plunger 16, and, while the carriers continue at rest, plunger 16 makes its reciprocation upward and down again. In its upward stroke plunger 16 drives plunger 11, and the latter in its rise carries a rubber hemisphere seated upon it into the aligned seat 31 of the overhanging carrier. The hemisphere is then engaged externally by seat 31, and when the plunger 11 descends again the hemisphere remains seated in carrier 3. Springs 17 are provided for returning plungers 11 and with them plunger 16 to the lower limit of the range of reciprocation. The upward reciprocation is effected in desired periodicity, and in organized synchronism with carrier rotation, by means of a cam 18 mounted on a constantly rotating shaft 19. It is against the thrust of this cam that springs 17 yield.

Referring to Fig. IV, the direction of rotation of carrier 3 may be understood to be counter-clockwise. Of the nine stations in the course of a complete rotation, it is station $a$ where transfer is effected of a rubber hemisphere from carrier 1 to carrier 3, and it is station $b$ where discharge is effected of the hemisphere from carrier 3. The seats with which carrier 3 is equipped have been described to include annular members 31, and, cooperating with these, central, vertically reciprocable plungers 32 are provided. Normally the plunger 32 is held by the tension of a spring 37 at the upper limit of its range of reciprocation, and when in such position the seat 31 is capable of receiving and retaining a rubber hemisphere, introduced in the manner described. When the carrier 3 comes to rest the plunger 32 associated with that hemisphere seat which is at the station $b$ (Fig. IV) is caused to reciprocate downward, and in so doing to drive a seated hemisphere from the seat, allowing it to fall to a receptacle there arranged to receive it. The same cam 18 which effects the upward thrust of plunger 16 may, through lever 33, link 34, shaft 35, and arm 36, effect simultaneously the downward thrust of the plunger 32 of that hemisphere seat which is at station $b$.

Referring still to Fig. IV, it is during the advance of a rubber hemisphere seated in carrier 3, from station $a$ to station $b$, that instrumentalities act upon it, first, to trim away the flash or fin from its periphery; and, second, to buff the face of its beveled edge.

The flash-trimming means conveniently take the form of a pair of constantly rotating circular blades 41 and 42 which cooperate in a plane angularly disposed to the vertical (Fig. I), and which are adapted to engage the flash at the very edge of a seated hemisphere as, in the rotation of carrier 3, it comes to the station indicated at $c$, Fig. IV. The hemisphere seat 31 is freely rotatable in carrier 3; and, as a seat bearing a hemisphere approaches station $c$ and is engaged by the constantly rotating shears, it responds by rotation to the entraining effect of the cooperating rotary shear blades; and the consequence and effects is that, while the individual hemisphere continues at station $c$, the flash which it has borne is cut neatly and completely away, and falls to a receptacle provided for it. From station $c$ the hemisphere advances in trimmed condition.

At a station beyond $c$, at the station $d$ (Fig. IV), the beveled edge of the hemisphere is buffed. As the rotatable seat 31 comes to position $d$, a disk 38 with which it is equipped is engaged by a constantly rotating friction disk 51, and by such engagement is positively rotated in one direction. A rotatable buffer wheel 52 is borne on a vertical and reciprocable stem 53, and reciprocation in synchronism with the movement of other parts of the machine may be effected by means of a cam 54, borne by a shaft 55. Means are provided for rotating stem 53, and with it buffer wheel 52, at least during so much of the time as the stem and wheel are in elevated position. Such rotating means are indicated by the pulley 56, which may be understood to be splined to stem 53. The direction of rotation is opposite to that which, by the instrumentalities described, is imparted to the carrier-borne hemisphere. A spring 57 tends to hold the stem 53 at the lower limit of its range of reciprocation. From such lower position the stem and with it wheel 52 are, periodically, raised to functioning position, by means of cam 54.

The wheel 52 is here shown to have an upwardly tapering conical face; its angular inclination is such as to correspond to that of the inwardly disposed bevel of a hemisphere borne by carrier 3; and its diameter is less than that of a hemisphere to be buffed, to the end that, arranged (when in operation) within the concavity of the hemisphere, it shall engage the edge of the hemisphere along a single line.

When a carrier-borne hemisphere trimmed at station c has advanced to station d, buffer wheel 52 rises and engages its beveled edge. Opposite rotation of the hemisphere and of the buffer wheel 52 upon their several axes effects the buffing of the edge of the hemisphere. When the buffing has so been completed, cooperation of cam 54 and spring 57 effect the return of the buffer wheel to inactive position, leaving the hemisphere free to advance as carrier 3 turns again, until at length it comes to station b and is discharged.

It will be understood that ordinarily two machines of the sort described are provided, one for the hemispheres with inwardly beveled edges; the other for hemispheres with outwardly beveled edges. And it will be understood that the second machine may be identical with that here shown and described, except in the minute shape and position of the buffer wheel 52. In that other machine the working face of the buffer wheel will be tangent to the hemisphere rim, not internally, but externally. Again, one and the same machine may be built to carry alternatively either inner-bevel buffing instrumentalities or outer-bevel buffing instrumentalities; and, after a quantity of hemispheres of one shape have been trimmed and buffed, the machine may be changed over, and a corresponding quantity of hemispheres of the other shape may be trimmed and buffed.

I have described the buffing instrumentalities as including means for rotating the rubber hemisphere and the buffer wheel in opposite directions. This is preferable; though, manifestly, it is essential to successful buffing only that along the line in which the buffing wheel meets the surface to be buffed the speeds of movement shall be in non-conformity. When it comes to buffing an outward facing bevel, the buffing wheel will be arranged not within the circle of the rubber hemisphere (as shown in the drawings), but outside of the circle of the rubber hemisphere; and the tangency will be a tangency not from the inside but from the outside of the rubber hemisphere. In such arrangement, it will ordinarily be preferred that the rubber hemisphere and the buffing wheel rotate in the same direction; in which case the two surfaces on the line of tangency will be moved in opposite directions. It is entirely within the knowledge of a machine builder to effect rotation of the buffer wheel in whichever direction may be desired, and to provide instrumentalities by which from one source the buffer wheel may be rotated in either of the two directions, to suit conditions where in a single machine two buffer wheel positions are alternately to be assumed, either that of internal tangency or that of external tangency.

In describing the flash trimming means, I have explained that the seat 31, rotatable in carrier 3, may be freely responsive to the rotative influence imparted to it when the rotary shear blades engage the flash of a hemisphere borne by the seat. It is manifestly practicable by such means as I have described for rotating the seat when at the station d, to rotate it positively when at the station c. Or it is entirely possible by other means to rotate it positively when at the station c. In such case the rotative effect of the shearing blades themselves will not be relied upon, and the shearing instrumentalities may then be of such particular form and character as the engineer may choose, regardless of whether they have rotative effect upon the article or not.

In operation an attendant places the hemispheres as they come from the molds, concavity down, upon the seats 11 as in the rotation of carrier 1 the seats come successively to station m. Upon carrier 1 the hemisphere advances until it comes to alignment beneath a seat in carrier 3, at station a. Thereupon the stem whose upper end has constituted the seat for the hemisphere rises, and thrusts the hemisphere into a seat 31 in carrier 3. The stem 11 then descends, leaving the hemisphere frictionally held in its seat in carrier 3. Borne by carrier 3, the hemisphere advances, and comes at length to station c. As it approaches station c the flash which extends from its edge is engaged by the rotating blades 41, 42 of the trimming device. The hemisphere and the seat 31 in which it is engaged rotate in response to the stress exerted by the rotating cutter blades, and while the hemisphere continues at station c the flash is trimmed away. In the further turning of carrier 3 the hemisphere comes to station d, and when at that station the seat 31 and the hemisphere with it are positively rotated in one direction while the buffer wheel, tangent to its beveled edge, is positively rotated in opposite direction. When buffing has so been accomplished, the cam 54 and the spring 57 effect the withdrawal of the buffer wheel, and then the rotation of carrier 3 is resumed. When at length the trimmed and buffed hemisphere reaches station b, plunger 32 descends and drives the fully machined hemisphere from its seat in carrier 3.

I have described the machine in simple form, particularly in this respect—that the hemisphere is retained first upon one seat and then upon another by friction alone (or by friction with the aid of gravity). Manifestly, the machine may be elaborated, and the friction seats may be replaced with suction cups such as are well known in conveying apparatus of various sorts.

I claim as my invention:

1. In rubber-ball making machinery the combination of a movable carrier, means rotatably borne in said carrier and adapted to engage a hemispherical shell of rubber, a reciprocable plunger adapted to drive a hemispherical shell of rubber from such engaging means, and shearing mechanism and buffing mechanism arranged to operate successively upon a shell in place in said carrier at successive stages in the progress of carrier movement.

2. In rubber-ball making machinery the combination of an intermittently rotatable carrier, a seat for a hemisphere of rubber rotatably mounted in said carrier, automatic means for placing a hemisphere of rubber in such seat, automatic means for ejecting a hemisphere of rubber from such seat, the two said means being spaced apart at an interval with respect to a complete rotation of the carrier, and a flash trimmer and an edge buffer arranged in cooperative relation to said carrier and interposed between said placing and ejecting means and adapted to act in succession upon a hemisphere of rubber in place in such seat.

3. In rubber-ball making machinery the combination of two rotary carriers arranged in parallel and spaced-apart planes and overlapping throughout a portion only of their extent, means for rotating the said carriers in synchronism and with ordered intermittency, means for transferring a hemisphere of rubber from one carrier to the other, means for ejecting a hemisphere of rubber from the second carrier, and means cooperating with the second carrier for trimming a hemisphere of rubber while borne by the second carrier and during an interval of intermitted rotation thereof.

4. In rubber-ball making machinery the combination of two rotary carriers arranged in parallel and spaced-apart planes and overlapping throughout a portion only of their extent, means for rotating the said carriers in synchronism and with ordered intermittency, means for transferring a hemisphere of rubber from one carrier to the other, means for ejecting a hemisphere of rubber from the second carrier, and means cooperating with the second carrier for buffing the edge of a hemisphere of rubber while borne by the second carrier and during an interval of intermitted rotation thereof.

5. In rubber-ball making machinery the combination of two rotary carriers arranged in parallel and spaced-apart planes and overlapping throughout a portion only of their extent, means for rotating said carriers in synchronism and with ordered intermittency, a seat in one of said carriers and a plunger borne by the other of said carriers and adapted to sustain a hermisphere of rubber and by reciprocation to place such hemisphere in the seat of the other carrier, means effective when carrier rotation is intermitted to reciprocate said plunger, and a tool adapted to engage a hemisphere of rubber when borne in the aforesaid carrier seat and during an interval of intermitted rotation of the carrier.

6. In rubber-ball making machinery the combination of a rotary carrier, means for rotating said carrier with ordered intermittency, a seat for a hemisphere of rubber borne by said carrier, a tool adapted to engage a hemisphere of rubber when seated in the said carrier and during an interval of intermitted rotation thereof, and means for ejecting a hemisphere of rubber from said seat, such means including a reciprocatory plunger and means co-ordinated with the carrier-rotating means and adapted to reciprocate the said plunger during the intermittency of carrier rotation.

7. In rubber-ball making machinery the combination of an intermittently movable carrier, a seat for a hemisphere of rubber rotatably borne by said carrier, a buffing wheel rotatably mounted adjacent said carrier and adapted to engage the rim of a hemisphere of rubber in place in said seat, together with means for rotating said seat in non-conformity to the rotation of the buffer wheel when the buffing wheel is in engagement with a seated hemisphere.

8. In rubber-ball making machinery the combination of an intermittently movable carrier, a seat for a hemisphere of rubber rotatably borne by said carrier, and a buffing wheel mounted adjacent said carrier and rotatable and axially reciprocable in such mounting.

In testimony whereof I have hereunto set my hand.

WALTER E. HUMPHREY.